Patented Sept. 28, 1937

2,094,064

UNITED STATES PATENT OFFICE 2,094,064

PRODUCTION OF ETHYL CHLORIDE

Walter Flemming, Ludwigshafen-on-the-Rhine, Germany, assignor to I. G. Farbenindustrie Aktiengesellschaft, Frankfort - on - the - Main, Germany No Drawing. Application August 28, 1935, Serial No. 38,212. In Germany September 11, 1934

3 Claims. (Cl. 260—166)

The present invention relates to an improved process for the production of ethyl chloride.

For the manufacture and production of ethyl halides by the treatment of ethylene with hydrogen halides in the gas phase, it has already been proposed to employ, as catalysts, halides mainly of trivalent metals, such as aluminium chloride, iron chloride, bismuth chloride, antimony chloride, vanadium chloride or their oxyhalides, if desired distributed on carrier substances. These catalysts have the disadvantage that they lose their activity after a short time or at least their efficiency is greatly reduced.

I have now found that it is very advantageous to carry out the said process by employing as the catalyst zinc halides distributed on porous carrier substances. The activity of the zinc halides can be considerably increased by activation, preferably with halides of monovalent metals or of divalent metals other than zinc. For example lithium chloride, magnesium chloride, calcium chloride, cuprous or cupric chloride, stannous chloride or the corresponding bromine compounds are suitable for activation.

The activating agent is usually employed in the proportion of 1 part to each 5 parts of zinc halide, but the said proportion may be varied within wide limits without affecting the activity of the catalyst.

As the carrier substance it is preferable to employ a porous material, such as clay sherds, wood carbon, kieselguhr and in particular active silica. The application of the catalyst to the carrier is preferably effected by bringing the latter into contact with an aqueous or hydrochloric acid solution of the zinc halide or halide mixture, the excess of water then being driven off by moderate heating, as for example in a porcelain crucible or directly in the reaction tube. For example, 25 grams of zinc chloride and 5 grams of stannous chloride may be dissolved in 30 cubic centimeters of water to which 10 cubic centimeters of concentrated hydrochloric acid have been added and the whole applied to 100 cubic centimeters of silica gel. The slightly moist mass is then heated while stirring until the originally glassy silica gel has been converted into an opaque product.

The preparation of ethyl chloride by leading ethylene and hydrochloric acid over the said catalysts at room temperature is preferably carried out under increased pressure, as for example at from 30 to 60 atmospheres; the reaction proceeds however more rapidly at higher temperatures, as for example at 150° C. When atmospheric pressure is used for the preparation of ethyl chloride, a conversion of from 60 to 70 per cent is attained for example at from 180° to 210° C. Generally speaking the reaction may be carried out at from room temperature to 300° C. The reaction proceeds with the evolution of heat. Instead of using ethylene alone, gas mixtures containing ethylene may be employed. When employing gas mixtures having a small content of ethylene, it is preferable to work under increased pressure.

The following examples will further illustrate how my invention may be carried out in practice but the invention is not restricted to these examples.

Example 1

10 liters of ethylene and 10.2 liters of hydrogen chloride gas per hour are led at from 180° to 200° C. over a catalyst consisting of 80 cubic centimeters of silica gel, 25 grams of zinc chloride and 5 grams of stannous chloride. After four hours, 63.6 grams of ethyl chloride of a very pure nature are formed.

Example 2

5 liters of ethylene and 5 liters of hydrogen bromide gas are led per hour at 50° C. over a catalyst consisting of 15 cubic centimeters of silica gel and 2 grams of zinc bromide. The yield of ethyl bromide per hour is 17.1 grams.

Example 3

An autoclave of 370 cubic centimeters internal capacity and constructed of chromium-nickel steel (so-called V2A-steel) is charged with a catalyst consisting of 50 grams of zinc chloride and 10 grams of cuprous chloride applied to 350 cubic centimeters of silica gel. There are then pressed in 30 atmospheres of hydrogen chloride gas and 30 atmospheres of ethylene. Conversion into ethyl chloride takes place even at room temperature. When the pressure gauge indicates that the pressure has fallen to 20 atmospheres, 10 atmospheres of hydrogen chloride gas and 10 atmospheres of etheylene are pressed in, this time with external heating to 80° C.; this procedure is repeated until 54.8 liters of hydrogen chloride gas and 54.8 liters of ethylene have been pressed in during the course of two hours. The pressure is then released, whereby the ethyl chloride distills off. The yield of ethyl chloride (which is only contaminated with slight amounts of hydrogen chloride) is 140 grams corresponding to 95.3 per cent of the theoretical yield.

What I claim is:

1. In the catalytic production of ethyl chloride from ethylene and hydrogen chloride the step which comprises leading the gas mixture over a catalyst containing essentially a zinc halide activated with halides of metals selected from the group of mono and divalent metals consisting of lithium, magnesium, calcium, copper and divalent tin, the catalyst being distributed on a porous carrier.

2. In the catalytic production of ethyl chloride from ethylene and hydrogen chloride the step which comprises leading the gas mixture at a temperature of between room temperature and 300° C. over a catalyst containing essentially a zinc halide activated with halides of metals selected from the group of mono and divalent metals consisting of lithium, magnesium, calcium, copper and divalent tin, the catalyst being distributed on a porous carrier.

3. In the catalytic production of ethyl chloride from ethylene and hydrogen chloride the step which comprises leading the gas mixture under superatmopsheric pressure over a catalyst containing essentially a zinc halide activated with halides of metals selected from the group of mono and divalent metals consisting of lithium, magnesium, calcium, copper and divalent tin, the catalyst being distributed on a porous carrier.

WALTER FLEMMING.